United States Patent [19]
Suzuki

[11] Patent Number: 5,966,274
[45] Date of Patent: Oct. 12, 1999

[54] MAGNETO-RESISTIVE MAGNETIC HEAD WITH TRACK WIDTH DEFINED BY OPPOSITELY POSITIONED RECESSES AND MANUFACTURING METHOD THEREFOR

[75] Inventor: Toru Suzuki, Miyagi, Japan

[73] Assignee: Sony Corporation, Tokyo, Japan

[21] Appl. No.: 08/974,349

[22] Filed: Nov. 19, 1997

[30] Foreign Application Priority Data

Nov. 22, 1996 [JP] Japan ............................... P08-312371

[51] Int. Cl.⁶ ....................................................... G11B 5/39
[52] U.S. Cl. ............................................................. 360/113
[58] Field of Search ..................................... 360/113, 121, 360/122, 125

[56] References Cited

U.S. PATENT DOCUMENTS 5,034,838  7/1991  Brock et al. ............................. 360/122
5,729,413  3/1998  Gooch et al. ........................ 360/121 X Primary Examiner—John H. Wolff
Attorney, Agent, or Firm—Hill & Simpson

[57] ABSTRACT

A magneto-resistance effect magnetic head having a magneto-resistance device arranged for causing the reproducing current to flow perpendicularly to a recording medium, wherein recesses are formed in a recording medium facing surface of the magnetic head on both ends thereof in the track width direction of the magneto-resistance device.

3 Claims, 4 Drawing Sheets

MAGNETO-RESISTIVE MAGNETIC HEAD WITH TRACK WIDTH DEFINED BY OPPOSITELY POSITIONED RECESSES AND MANUFACTURING METHOD THEREFOR

BACKGROUND OF THE INVENTION

1. Field of the Invention

This invention relates to a magnetic head for detecting changes in resistance of a magnetic thin film, the resistivity of which is changed with a recording magnetic field by a recording magnetic field from a magnetic recording medium, as a playback output voltage, and to a method for manufacturing the magnetic head.

2. Description of Related Art

Recently, a magneto-resistance effect device (MR device) has come to be used as a magneto-resistance magnetic head (MR head) in the field of a thin film magnetic head adapted for reproducing information signals recorded on, for example, a hard disc. The MR device, now in use, employs what is termed an anisotropic magneto-resistance device exhibiting a rate of change in resistivity of the order of 2%.

This MR head includes a MR device, the resistance of which is changed depending on the magnitude of the impressed magnetic field, and a bias conductor for applying the bias magnetic field across this MR device. For reproducing the information signals from a magneto-resistance effect by the MR head, the bias current is applied to the bias conductor for impressing the bias magnetic field across the MR device. Since the MR device has its resistance changed depending on the magnitude of the magnetic field from the magnetic recording medium, the information signals recorded on the magnetic recording medium can be reproduced based on changes in the voltage value caused by changes in resistance.

If, in this MR head, the MR device is arranged relative to the magnetic recording medium so that the reproducing current will be caused to flow perpendicularly relative to the magnetic recording medium, the magnetic recording medium can be reduced in track width to enable the information signals to be reproduced.

For improving the recording density of the magnetic recording medium, such as a hard disc, there are known a method of narrowing the track width for increasing the track density and a method of increasing the line recording density.

For increasing the line recording density, there is known a method of narrowing the magnetic gap provided on a recording magnetic head for generating a steep recording magnetic field by the magnetic gap for recording information signals and reproducing the information signals recorded by this recording magnetic head by a MR head with high resolution.

On the other hand, for increasing the track density, there is known a method of decreasing the track width of the magnetic head during recording and/or reproduction. At this time, a MR head of high playback output is indispensable for not lowering the playback output of the recorded information signals.

Meanwhile, in the above-described MR head, the longitudinal size of the MR device along the track width needs to be precisely set in manufacturing the MR device in keeping up with the decreasing track width brought about by the recent demand towards higher recording density. In a compound magnetic head, in which the above-mentioned MR head is unified with an induction type recording magnetic head, it is necessary to set the relative position of the MR device and the magnetic core within a pre-set offset range in manufacturing the MR head. Therefore, the allowance of the relative positions of the MR device and the magnetic core in the manufacturing process for the compound magnetic head is extremely small.

However, with the above-described compound magnetic head, made up of plural thin films layered together with a thickness of each layer being several micrometers, it is not that easy to observe the offset value within an allowable range. Moreover, with the above-described compound magnetic head, since the longitudinal size along the track width of the magnetic gap by the MR device and the magnetic core is diminished in keeping up with the demand for reduction in track width of the magnetic recording medium, magnetic influences ascribable to the shape of the terminal end of the MR device and the magnetic core become predominant. Thus, with the present MR device and the magnetic core, it is not that easy to diminish the longitudinal size thereof in the track width direction.

Thus, the MR head suffers from the problem that, in the manufacturing process of the MR head, the production yields are lowered due to the error exceeding the above-mentioned allowable range of the offset value and to the error in the longitudinal size of the magnetic gap along the track width.

SUMMARY OF THE INVENTION

It is therefore an object of the present invention to provide a magnetic head in which the MR device and the magnetic gap are formed to high precision to reduce the error with respect to the offset amount to improve the playback output, and a method for manufacturing the magnetic head.

The present invention provides a magnetic head having a magneto-resistance device arranged for causing the reproducing current to flow perpendicularly to a recording medium, wherein a recesses are formed in a recording medium facing surface of the magnetic head so that a cut-out or recess will be formed on both ends in the track width direction of the magneto-resistance device.

Preferably, the magnetic head includes a recording magnetic head for recording on a recording medium and a recess is formed on each end in the track width direction of the magnetic gap of the recording magnetic head.

Since the above-described magnetic head has a cut-out or recess at each end of the magnetic gap in the track width direction, the surface facing the recording medium of the magneto-resistance device and the magnetic gap in the track width direction can be set to pre-set lengths.

Preferably, the pre-set depth of the cut-out or recess in the vertical direction to the recording medium can be set so as to be approximately equal to the length of the magneto-resistance device in a direction perpendicular to the recording medium. With the magnetic head having the above-described magneto-resistance device decreased in length along the track width, the result is an increased resistance of the magneto-resistance device because the length of the cut-out in a direction perpendicular to the recording medium is selected to be approximately equal to the longitudinal size of the magneto-resistance device.

The above cut-out is effective for the so-called vertical type MR head having the magneto-resistance device arranged for causing the reproducing current to flow perpendicular to the recording medium. However, the cut-out cannot be applied to the so-called transverse type MR head 20 having a magneto-resistance device arranged for allowing the reproducing current to flow along the recording medium because the longitudinal size t7 of the magneto-resistance device 21 in a direction D perpendicular to the recording medium is as small as approximately 1 to 0.5 µm, such that, if the cut-out s formed in the connection electrode 22, the magneto-resistance device 21 tends to be ruptured.

The present invention also provides a method for manufacturing a magnetic head having a magneto-resistance device arranged for causing the reproducing current to flow perpendicularly to a recording medium, including forming a recess in a recording medium facing surface of the magnetic head so that a cut-out will be formed on both ends in the track width direction of the magneto-resistance device.

Preferably, the cut-out is formed by a converged ion beam.

Since the manufacturing method for the magnetic head includes the step of forming a recess in a recording medium facing surface of the magnetic head so that a cut-out will be formed on both ends in the track width direction of the magneto-resistance device, it becomes possible to from the magneto-resistance device to a pre-set length in the track width direction.

With the magnetic head according to the present invention, the track width of the magneto-resistance device for the magnetic recording medium can be set to an optional value, so that the track width of the magnetic head can be decreased to keep up with reduction in track width in meeting with demand for higher surface recording density.

With the manufacturing method for the magnetic head according to the present invention, a magnetic head may be produced with a small longitudinal size in the track width direction of the magneto-resistance device and the magnetic gap. Therefore, with the magnetic head, manufactured as described above, information signals can be recorded/reproduced with narrow track width on the magnetic recording medium.

Also, with the manufacturing method for the magnetic head, in which the magnetic head having a reduced longitudinal size of the magneto-resistance device and the magnetic gap in the track width direction is formed by a converged ion beam, there is no necessity of using fine light exposure techniques, thus enabling facilitated manufacture. Moreover, with the present manufacturing method for the magnetic head, the cut-outs are formed on both ends of the magneto-resistance device and the magnetic gap in subsequent steps, even in case the track width size of the magneto-resistance device and the magnetic gap is increased due to malfunctions in the magnetic head manufacturing process, thus enabling production yields to be improved.

DESCRIPTION OF THE PREFERRED EMBODIMENTS

Figure 1:
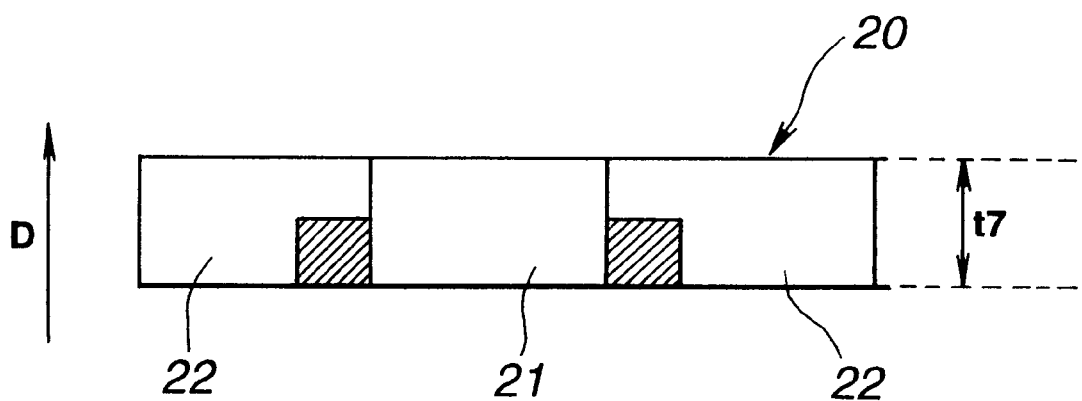
FIG. 1 is a schematic view showing the state in which trimming portions have been formed for the MR device provided on a transverse type MR head.

Referring to the drawings, preferred embodiments of a magnetic head and a manufacturing method therefor, according to the present invention, will be explained in detail.

Figure 2:
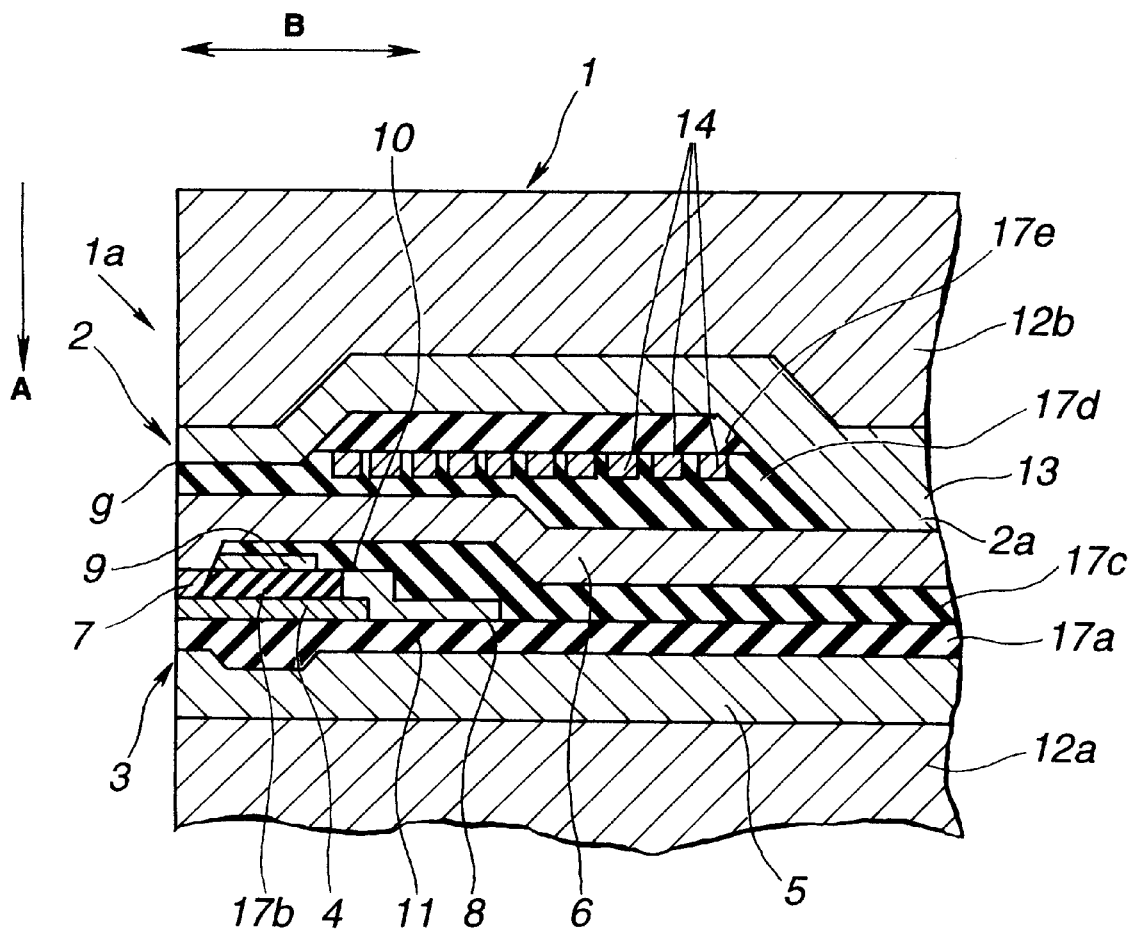
FIG. 2 is a cross-sectional view showing an illustrative magnetic head according to the present invention.

A magnetic head 1 of the illustrated embodiment includes an induction magnetic head 2 for recording information signals on a magnetic recording medium and a magneto-resistance effect type magnetic head 3 (MR head 3) for reproducing the information signals recorded on the magnetic recording medium, as shown in FIG.2. The one end surfaces of the induction magnetic head 2 and the MR head 3 constitute a recording medium facing surface 1a.

The MR head 3 is arranged on the magnetic recording medium during reproduction of the information signals for reproducing the recorded information signals. This MR head 3 is comprised of a magneto-resistance device (MR device 4) sandwiched between a first magnetic layer 5 and a second magnetic layer 6. The MR head 3 includes a MR device 4 for detecting magnetic signals from the magnetic recording medium, a forward side electrode 7 and a rear side electrode 8 formed on both ends of the MR device 4 for impressing the sense current, and a bias conductor 9 formed on the MR device 4 with an insulating layer in-between. The first magnetic layer 5 and the second magnetic layer 6 are provided for sandwiching the MR device 4, forward side electrode 7 and rear side electrode 8 and the bias conductor 9 in-between. The first magnetic layer 5 and the second magnetic layer 6 are formed each with an upper side groove 10 and a lower side groove 11.

The MR device 4 is formed of a material exhibiting magneto-resistance effect for detecting the information signals from the magnetic recording medium. The MR device 4 is arranged so that its longitudinal direction B is perpendicular to the facing surface to the magnetic recording medium, that is to the recording medium facing surface 1a, and so that its one end face is exposed to the recording medium facing surface 1a. This MR device 4 is formed with the forward side electrode 7 and the rear side electrode 8 at a portion thereof towards the recording medium facing surface 1a and at a portion spaced a pre-set distance from the forward end portion.

Figure 3:
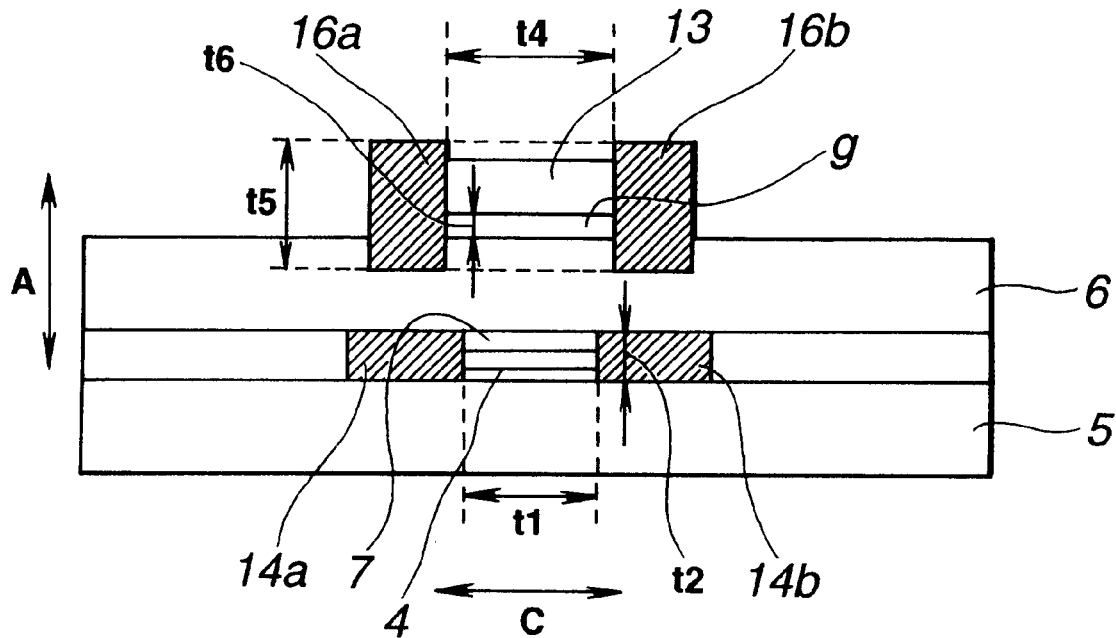
FIG. 3 shows a magnetic head looking from its surface facing the recording medium.

FIG.3 shows the MR device looking from the recording medium facing surface 1a. This MR device 4 has first trimming portions 14a, 14a on both ends along the track width C so as to have a pre-set length t1 in the track width direction C. These first trimming portions 14a, 14b are recesses formed in the recording medium facing surface 1a. These first trimming portions 14a, 14b, formed on both ends of the MR device 4, regulate the longitudinal size t1 during reproduction of the MR device 4.

Figure 4:
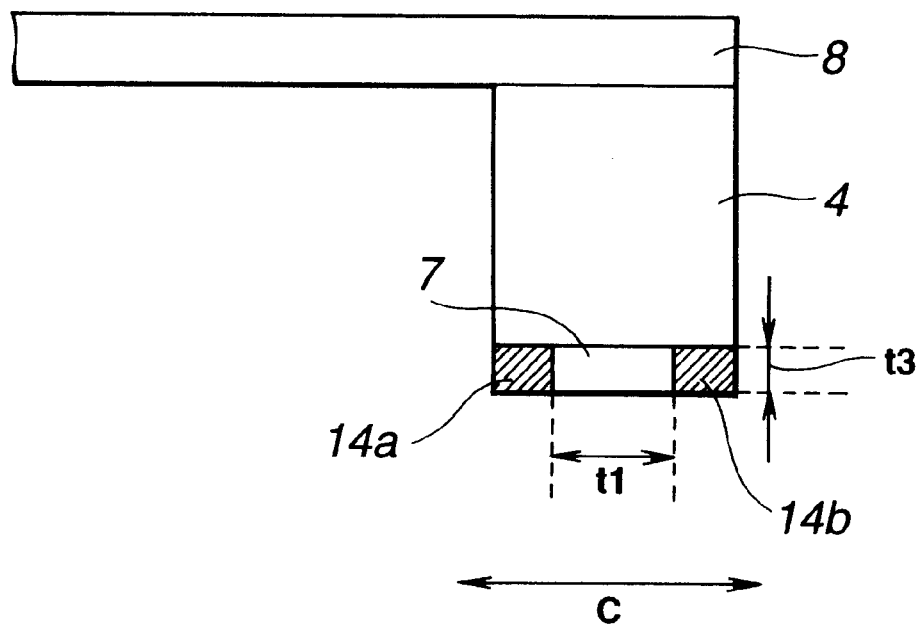
FIG.4 shows an illustrative state in which trimming portions have been formed for the MR device.
Figure 5:
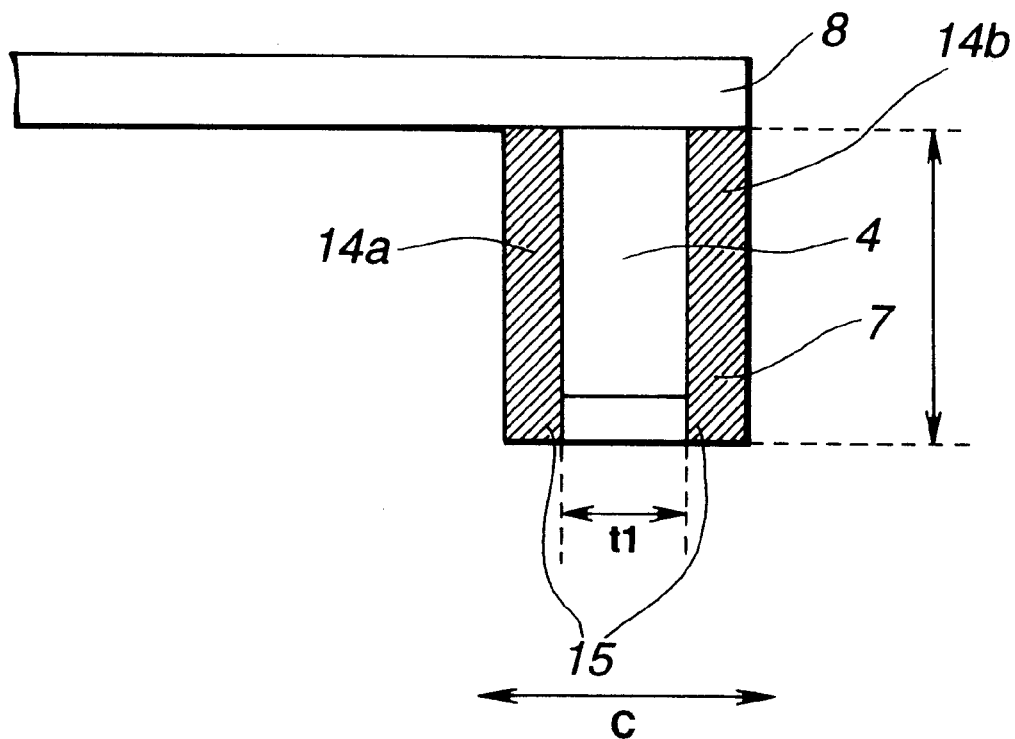
FIG. 5 shows another illustrative state in which trimming portions have been formed for the MR device.

In the instant embodiment, the first trimming portions 14a, 14b are formed so that the track width t1 of the MR device 4 will be approximately 2 µm. The first trimming portions 14a, 14b are also formed as recesses on both ends of the MR device 4, as shown in FIG.4, which shows the forward side electrode 7 and the rear side electrode 8 looking from the side of the second magnetic layer 6. Referring to FIG.4, the first trimming portions 14a, 14b are formed so as to have a length t3 along the longitudinal direction of the MR device 4 such as by trimming the MR device 4 and the forward end electrode 7. The length t3 of the first trimming portions 14a, 14b along the length of the MR device 4 is selected to be insufficient to entrain the magnetic flux proper to the magnetic signals recorded on the magnetic recording medium.

In the instant embodiment, the length t3 of the first trimming portions 14a, 14b along the longitudinal direction of the MR device 4 is selected to be not less than approximately 0.5 µm.

In the instant embodiment, the first trimming portions 14a, 14b are formed by a focused ion beam device (FIB device). The FIB device enables fine processing by sputtering by illuminating a converged ion beam. Also, the first trimming portions 14a, 14b are formed so that the longitudinal size t1 of the MR device 4 in the direction of the track width C will be approximately 2 μm.

With the MR device 4, the first trimming portions 14a, 14b of which have been formed as described above, the track width t1 relative to the magnetic recording medium can be optionally set, so that, with the present MR device 4, the track width t1 can be reduced in keeping up with track width reduction imposed by the increasing surface recording density.

Meanwhile, the longitudinal length t3 of the first trimming portions 14a, 14b along the length of the MR device 4 can be the length of a magnetically sensitive portion of the MR device 4. The length t1 of the trimming portions 14a, 14b along the width of the MR device 4 is of the same value as the size shown in FIG.4. With this MR device 4, the length thereof along the track width C at the time of reproducing the magnetic recording medium can be decreased. On the other hand, the length t1 along the track width C is reduced in the entire longitudinal direction. Thus, if the electrical resistance is increased and the rate of change of resistance is unchanged from that of the device not formed with the trimming portion 15, the amount of change in resistance can be increased. Thus, if the amount of change in resistance is $\Delta R$ and the current value supplied at the time of reproduction is I, it becomes possible with the MR device 4 to increase the playback output of the MR head 3 represented by $\Delta R \cdot I$.

Meanwhile, it is unnecessary for the MR device 4 to be of a mono-layer structure formed solely of a material exhibiting magneto-resistance effect. For example, it may be of a layered structure of plural layers of a material exhibiting the magneto-resistance effect, with the interposition of insulating layers, such as $SiO_2$ or $Al_2O_3$ layers, for preventing the occurrence of the Barkhausen noise which is the noise caused by movement of the magnetic wall.

The forward side electrode 7 and the rear electrode 8 are formed for causing the sense current to flow along the longitudinal direction of the MR device 4, that is in a direction perpendicular to the magnetic recording medium. These forward side electrode 7 and the rear electrode 8 are formed of, for example, an electrically conductive non-magnetic material.

The bias electrode 9 is formed on the upper surface of the MR device 4 for impressing the bias magnetic field across the MR device 4. The bias conductor 9, fed with the current, generates a bias magnetic field, which is impressed in a direction substantially perpendicular to the longitudinal direction of the MR device 4. For maintaining the electrical insulation with respect to the MR device 4, the bas conductor 9 is formed on the MR device with an insulating layer in-between.

The second magnetic layer 6, formed on the bias conductor 9, is formed for being connected to the forward end electrode 7 and magnetically shields the upper layer of the MR device 4. Thus, the second magnetic layer 6 is formed of an electrically conductive magnetic material, such as sendust (For example—Al—Si alloy). The second magnetic layer 6 not only magnetically shields the upper side of the MR device 4, but also operates as a forward side electrode of the MR device 4. The second magnetic layer 6 also operates as a magnetic core of the induction type magnetic head 2.

The first magnetic layer 5 is formed as a magnetic layer of, for example, sendust (For example—Al—Si alloy) on the non-magnetic substrate 12a formed of, for example, ceramics. The first magnetic layer 5 is formed via a lower gap on the MR device 4 with an insulating layer in-between. This lower gap is formed of an insulating material for maintaining insulating properties with respect to the first insulating layer.

The induction type magnetic head 3 is made up of a second magnetic layer 6, operating not only as a magnetic shield for shielding the external magnetic field from the MR device 4 provided on the MR head 3 but also as a recording magnetic core, and a coil 14 arranged between the second magnetic layer 6 and the third magnetic layer 13 for being fed with the recording signals. The spacing between the coil 14 on one hand and the between the second magnetic layer 6 and the third magnetic layer 13 on the other hand is charged with a nonmagnetic material for maintaining insulation.

The second magnetic layer 6 and the third magnetic layer 13 are formed of a magnetic material having excellent soft magnetic properties. The second magnetic layer 6 and the third magnetic layer 13 are layered so as to be bonded to each other at an end 2a for completing a magnetic closed loop. The second magnetic layer 6 and the third magnetic layer 13 are layered for defining a magnetic gap g on the sides thereof facing the recording medium facing surface 1a. Thus, when the coil 14 is fed with the recording signals, a magnetic field corresponding to the recording signals is generated in the magnetic gap g for enabling recording of information signals on the magnetic recording medium.

The induction type magnetic head, constructed as described above, is configured for exposing the magnetic gap g to the recording medium facing surface 1a. FIG.3 shows the induction type magnetic head looking from the side of the recording medium facing surface 1a. On both sides of the magnetic gap g of the induction type magnetic head, second trimming portions 16a, 16b are formed so as to have a pre-set longitudinal size t4 in the track width direction C for regulating the recording width t4 of the magnetic gap g on the magnetic recording medium. The second trimming portions 16a, 16b are formed so as to have a width t5 sufficient for the second magnetic layer 6 and the third magnetic layer 13 to be unable to record information signals. In the instant embodiment, the gap length t5 of the magnetic gap g defined by the second magnetic layer 6 and the third magnetic layer 13 is approximately 0.5 μm. In addition, the second trimming portions 16a, 16b are formed so as to have a length along depth sufficient for the magnetic gap g to be unable to record information signals on the magnetic recording medium.

In the instant embodiment, the second trimming portions 16a, 16b are formed so that the longitudinal size t4 of the magnetic gap g along the track width C will be approximately 3 μm. The second trimming portions 16a, 16b are formed so as to be sufficient for the magnetic gap g to be unable to record information signals on the magnetic recording medium. In the instant embodiment, the longitudinal size of the second trimming portions along the depth is set to approximately 1 μm. The longitudinal size of the second trimming portions along the depth may also be not less than approximately 1 μm.

With the above-described induction type magnetic head 2, since the second trimming portions 16a, 16b are formed by the FIB device on both ends of the magnetic gap g facing the recording medium facing surface 1a in the direction of the track width C, it becomes possible to reduce the longitudinal size t4 of the magnetic gap g in the track width direction C. Thus, with the induction type magnetic head 2, the longitudinal size t4 along the track width C of the magnetic gap g can be reduced, so that information signals can be recorded with a narrow track width t4 on the magnetic recording medium. Thus, it is possible with the first present induction type magnetic head 2 to record information signals to a high density on the magnetic recording medium.

The manufacturing method for the above-described magnetic head 1 is now explained. First, the first magnetic layer 5, formed of Ni—For example and functioning as a lower magnetic shield, is layered on a non-magnetic substrate 12a of ceramics or a vitreous material having a size corresponding to plural magnetic heads 1. A first insulating layer 17a is then layered on the first magnetic layer 5. On the first insulating layer 17a are then layered the MR device 4 and a second insulating layer 17b, in this order. On the second insulating layer 17b are formed the bias conductor 9 for impressing a pre-set bias magnetic field on the MR device 4, the forward side electrode 7 and the rear electrode 8 for detecting changes in resistance of the MR device 4 as changes in voltage. On the bias conductor 9 is layered a third insulating layer 17c.

Figure 6:
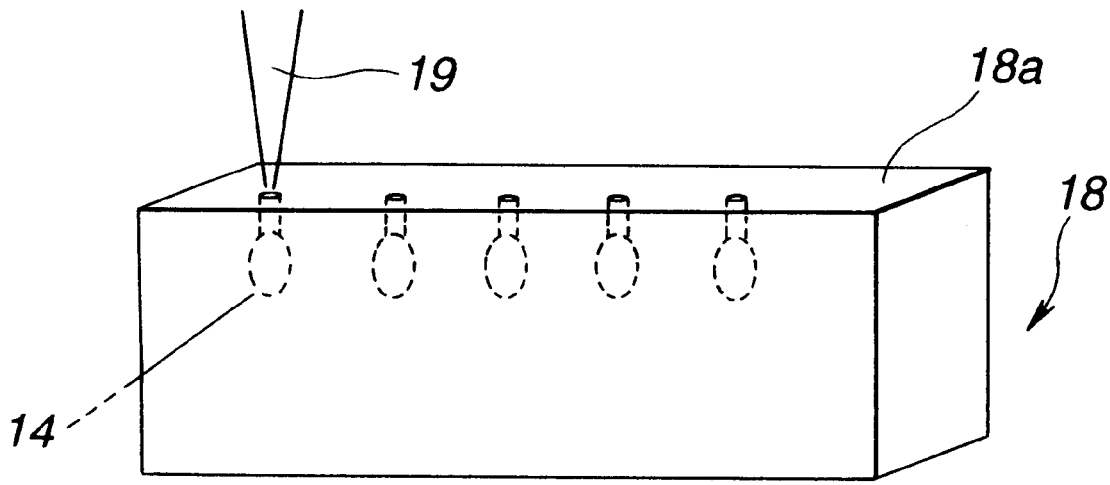
FIG.6 illustrates the state in which a converged ion beam is illuminated on a magnetic head block.

On the third insulating layer 17c is then layered a second magnetic layer 6 operating not only as a magnetic shield for the MR head 3 but also as a magnetic core of the induction type magnetic head 2. A fourth insulating layer 17d is then layered. On this fourth insulating layer 17d, a layer of an electrically conductive material functioning as a coil 14 of the induction type magnetic head 2 is formed by fine processing technique, such as etching. On the coil 14 is layered a fifth insulating layer 17e on which is layered a third magnetic layer 13 operating as a magnetic core. A protective layer 12b formed of an electrically non-conductive non-magnetic material is then layered on the third magnetic layer 13 for completing a magnetic head block 18 sized for slicing plural magnetic heads 1 therefrom as shown in FIG.6.

The first trimming portions 14a, 14b and the second trimming portions 16a, 16b are formed by the FIB device on the recording medium facing surface of the magnetic head block 18 produced by the above-described steps. These first trimming portions 14a, 14b and the second trimming portions 16a, 16b are formed on both ends on both ends in the track width direction C of the magnetic gap g and on both ends in the track width direction C of the MR device 4. The first trimming portions 14a, 14b and the second trimming portions 16a, 16b are first set on a stage of the FIB device and a light beam 19 is swept. That is, the first trimming portions 14a, 14b and the second trimming portions 16a, 16b are formed within the range of scanning precision of the light beam of the FIB device. That is, if the position of the first trimming portions 14a, 14b and the second trimming portions 16a, 16b are set by the FIB device, the trimming portions 14a, 14b and 16a, 16b can be formed within the scanning precision of the light beam 19. In the instant embodiment, the range of scanning precision of the light beam 19 provided in the FIB device is approximately 0.1 μm.

From the magnetic head block 18, formed with the first trimming portions 14a, 14b and the second trimming portions 16a, 16b, plural magnetic head s1 are sliced to complete the magnetic head 1.

With the above-described manufacturing method for the magnetic head 1, the first trimming portions 14a, 14b and the second trimming portions 16a, 16b can be formed to high precision on both ends in the track direction C of the MR device 4 and the magnetic gap g. Thus it is possible with the present manufacturing method for the magnetic head 1 to produce a magnetic head having a small longitudinal size in the track width direction of the MR device 4 and the magnetic gap g. Therefore, the magnetic head 1 produced in this manner can record or reproduce information signals with a narrow track on a magnetic recording medium.

Moreover, with the above-described manufacturing method for the magnetic head 1, the magnetic head 1 having a reduced longitudinal size in the track width direction C of the MR device 4 and the magnetic gap g can be manufactured easily by a simplified process without the necessity of using fine light exposure techniques involving complex processes, such as patterning. In addition, with the manufacturing method for the magnetic head 1 of the instant embodiment, production yields can be improved even if the longitudinal size of the MR device 4 or the magnetic gap g in the track direction C is excessive due to failure in the manufacturing process for the magnetic head 1, or the MR device is offset with respect to the magnetic gap, because the first trimming portions 14a, 14b and the second trimming portions 16a, 16b are formed in the subsequent steps on both ends of the MR device 4 and the magnetic gap g

What is claimed is:

1. A magneto-resistance effect magnetic head having a magneto-resistance device arranged for causing the reproducing current to flow perpendicularly to a recording medium, wherein recesses are formed in a recording medium facing surface of the magnetic head on both ends thereof in the track width direction of the magneto-resistance device.

2. The magnetic head as claimed in claim 1 including a recording magnetic head with a magnetic gap for recording on a recording medium, wherein recesses are formed in a recording medium facing surface of the magnetic head on both ends thereof in the track width direction of the magnetic gap.

3. The magnetic head as claimed in claim 1 wherein said recesses are formed over at least a magnetically sensitive portion of the magneto-resistance device in its entirety.

* * * * *